United States Patent [19]

Finlayson

[11] Patent Number: 4,475,950
[45] Date of Patent: Oct. 9, 1984

[54] PRINTING INK COMPOSITIONS CONTAINING ORGANOPHILIC CLAY GELLANT

[75] Inventor: Claude M. Finlayson, Houston, Tex.

[73] Assignee: NL Industries, Inc., New York, N.Y.

[21] Appl. No.: 371,405

[22] Filed: Apr. 26, 1982

Related U.S. Application Data

[63] Continuation of Ser. No. 207,543, Nov. 17, 1980, abandoned.

[51] Int. Cl.$^3$ ............................................. C09D 11/02
[52] U.S. Cl. ...................................... 106/20; 106/23; 252/315.1
[58] Field of Search ............................. 106/20, 22, 23; 252/316

[56] References Cited

U.S. PATENT DOCUMENTS

| | | | |
|---|---|---|---|
| 2,739,067 | 3/1956 | Ratcliffe | 106/30 |
| 2,750,296 | 6/1956 | Curado et al. | 106/30 |
| 2,754,219 | 7/1956 | Voet et al. | 106/32 |
| 2,885,360 | 5/1959 | Haden, Jr. et al. | 252/28 |
| 4,193,806 | 3/1980 | Finlayson | 106/20 |

Primary Examiner—Prince E. Willis
Assistant Examiner—Amelia B. Yarbrough
Attorney, Agent, or Firm—Burns, Doane, Swecker & Mathis

[57] ABSTRACT

Printing inks are provided comprising an organic ink vehicle having dispersed therein an ink coloring material and an organophilic clay gellant comprising the reaction product of a smectite-type clay having a cation exchange capacity of at least 75 milliequivalents per 100 grams of clay and a material selected from the group consisting of methyl trialkyl quaternary compound, benzyl trialkyl quaternary compound, and mixtures thereof, said quaternary being ammonium or phosphonium and wherein the alkyl groups contain 14 to 22 carbon atoms and the amount of said ammonium compound reacted with said clay being from 100 to 130 milliequivalents per 100 grams of clay based upon 100% active clay.

11 Claims, No Drawings

PRINTING INK COMPOSITIONS CONTAINING ORGANOPHILIC CLAY GELLANT

This is a continuation of application Ser. No. 207,543, filed Nov. 17, 1980 now abandoned.

This invention relates to improved printing inks and more particularly to printing inks adapted for high speed printing operations.

The dispersion of finely divided pigments, that is, ink coloring material, in organic ink vehicles to produce a material that is suitable as a printing ink is an exceedingly complex art. The type of surface being printed, the particular printing press being used, the speed of operation, and the time of drying are all basic factors which determine the necessary working qualities for a satisfactory ink.

The greatly expanded circulation of modern newspapers has brought about the development and use of high speed presses in the printing industry. This has required printing inks which set rapidly. Resin-base systems which can be dried by water, steam or hot air are gradually replacing the conventionally employed drying oils. Modern high speed presses require inks which will set in a matter of seconds rather than minutes.

For high-speed printing, inks must maintain a proper balance of tack, penetration and body control. Too high a degree of tack may cause the paper to tear or the ink to mist at high-press speeds. Ink with insufficient tackiness will not transfer properly in the printing operation. If penetration of the ink is too great, the print becomes visible from the opposite side of the paper, or causes blurring of figures. Poorly controlled penetration may result in smudging after the ink has been supposedly set. An ink must have body to prevent centrifugal throw-off at high-press speeds. In contrast, too viscous an ink will not flow properly from the fountains to the rollers.

These variations and the conditions that are necessary to be met makes it mandatory for the ink industry to rely on a large number of formulations. For example, U.S. Pat. No. 2,750,296 discloses a printing ink containing coloring matter dispersed in a vehicle comprising a oil-soluble resinous binder material dissolved in mineral oil, and containing therein a long chain aliphatic amine bentonite containing 34 carbon atoms in the aliphatic chain. In contrast, U.S. Pat. No. 2,754,219 discloses the formation of an anti-misting printing ink prepared by adding to an ink of which the principal vehicle constituent is a hydrocarbon containing an aromatic constituent, a finely divided organic derivative of montmorillonite in which the organic constituent includes a chain of at least 12 carbon atoms. In addition to these U.S. patents, U.S. Pat. No. 2,739,067 discloses a printing ink containing a modified clay which forms a gel in the organic vehicle and has a substantial gel characteristic therein. The prior art compounds, however, have all suffered from various disadvantages. For example, some require the undesirable use of polar dispersion additives which may react with other ink formulation components eliminating essential ink properties whereas others require numerous shearing actions through a roller mill to produce a viscosity-stable material which viscosity will not increase on storage with attendant high-labor costs, and concomitant production shut down.

In contrast to these prior art techniques, U.S. Pat. No. 4,193,806 discloses the preparation of a storage-stable printing ink comprising an organic ink vehicle and an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound wherein the alkyl groups contain 14 to 22 carbon atoms. The printing inks of this U.S. patent are disclosed as being able to attain full viscosity levels following one pass over a three roll mill in contrast to prior comparative gellants which continue to increase in viscosity. While this patented printing ink has advanced the state of the art to new levels, further advancement and improvement is necessary to eliminate the need to perform a prior high shearing action to attain acceptable viscosity levels.

A printing ink containing a viscosity increasing additive has been unexpectedly discovered comprising an organic ink vehicle having dispersed therein an ink coloring material and an organophilic clay gellant comprising the reaction product of a smectite-type clay having a cation exchange capacity of at least 75 milliequivalents per 100 grams of clay and a material selected from the group consisting of methyl trialkyl and benzyl trialkyl quaternary compound, said quaternary being selected from ammonium, and phosphonium wherein the alkyl groups are lineal or branched and contain 12 to 22 carbon atoms, and the amount of said quaternary compound reacted with said clay being from 100 to 130 milliequivalents per 100 grams of clay, based upon 100% active clay.

The clays used to prepare the organophilic clay gellants of this invention are smectite-type clays which have a cation exchange capacity of at least 75 milliequivalents per 100 grams of clay. Particularly desirable types of clay are the naturally-occurring Wyoming varieties of swelling bentonites and like clays, and hectorite, a swelling magnesium-lithium silicate clay.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound such as sodium carbonate, sodium hydroxide and the like, and shearing the mixture with a pugmill or extruder.

Smectite-type clays, natural or prepared synthetically by either a pneumatolytic or, preferably a hydrothermal synthesis process can also be used to prepare the present organophilic clays. Representative of such clays are montmorillonite, bentonite, beidelite, hectorite, saponite, and stevensite. These clays may be synthesized hydrothermally by forming an aqueous reaction mixture in the form of a slurry containing mixed hydrous oxides or hydroxides of the desired metals with or without, as the case may be, sodium (or alternate exchangeable cation of mixture thereof) fluoride in the proportions for the particular synthetic smectite desired. The slurry is then placed in an autoclave and heated under autogenous pressure to a temperature within the range of approximately 100° C. to 325° C., preferably 274° to 300° C., for a sufficient period of time to form the desired product.

The cation exchange capacity of the smectite-type clays can be determined by the well-known ammonium acetate method.

The quaternary material, that is the ammonium and phosphonium compounds which are reacted with the smectite-type clays are selected from the group consisting of a methyl trialkyl ammonium salt, a methyl trialkyl phosphonium salt, a benzyl trialkyl ammonium salt, a benzyl trialkyl phosphonium salt, and mixtures thereof wherein the alkyl groups comprise lineal or branched alkyl radicals having from 12 to 22 carbon atoms, saturated or unsaturated and mixtures thereof. Preferably the alkyl groups contain 16 to 18 carbon atoms and most preferably 20% to 35% of the alkyl radicals contain 16 carbon atoms and 60% to 75% contain 18 carbon atoms. The salt anion is preferably selected from the group consisting of chloride and bromide, and mixtures thereof, and is more preferably chloride, although other anions such as acetate, hydroxide, nitrite, etc., may be present in the quaternary salt to neutralize the quaternary cation. These quaternary salts can be represented by the formula:

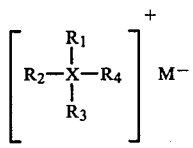

wherein X is nitrogen and phosphorous, and wherein $R_1$ is $CH_3$ or $C_6H_5CH_2$; and $R_2$, $R_3$ and $R_4$ are long chain alkyl radicals having 12 to 22 carbon atoms, and wherein $M^-$ is selected from the group consisting of chloride, bromide, nitrite, hydroxyl, acetate, methyl sulfate, and mixtures thereof.

The long chain alkyl radicals may be derived from naturally occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefins. Additional exemplary radicals include stearyl and oleyl.

The preferred quaternary ammonium salts are benzyl or methyl trihydrogenated tallow ammonium chloride. Commercially prepared hydrogenated tallow typically analyzes 2.0% $C_{14}$, 0.5% $C_{15}$, 20.0% $C_{16}$, 1.5% $C_{17}$, 66.0% $C_{18}$ and 1.0% $C_{20}$ alkyl radicals.

The organophilic clays of this invention can be prepared by admixing the clay, quaternary compound and water together, preferably at a temperature within the range of from 20° C. to 80° C., more preferably from 60° C. to 75° C. for a period of time sufficient for the organic quaternary compound to coat the clay particles followed by filtering, washing, drying, and grinding. When using the organophilic clays in emulsions, the drying and grinding steps may be eliminated. When admixing the clay, quaternary compound and water in such concentrations that a slurry is not formed, then the filtration and washing steps can be eliminated.

Preferably, the clay is dispersed in water at a concentration from about 1% to 80% and preferably 2% to 7% by weight, the slurry optionally centrifuged to remove non-clay impurities which constitute about 10% to about 50% by weight of the starting clay composition; the slurry agitated and heated to a temperature in the range of from 140° F. (60° C.) to 170° F. (77° C.); the quaternary ammonium or phosphonium salt added in the desired milliequivalent ratio, preferably as a liquid in isopropanol or dispersed in water; and the agitation continued to effect the reaction.

The amount of the quaternary compound added to the clay for purposes of this invention must be sufficient to impart to the clay the enhanced dispersion characteristics desired. The milliequivalent ratio is defined as the number of milliequivalents of the quarternary compound in the organophilic clay, per 100 grams of clay, 100% active basis. The organophilic clays of this invention have a milliequivalent ratio of from 100 to 130. At lower milliequivalent ratios the organophilic clays are ineffective gellants even though they may be effective gellants when dispersed in a conventional manner with a polar additive. At higher milliequivalent ratios, the organophilic clays are poor gellants. However, the preferred milliequivalent ratio within the range of from 100 to 130 will vary depending on the characteristics of the organic system to be gelled by the organophilic clay.

The printing ink is prepared in an economical and practical manner by simply incorporating the organophilic clay gellants into a basic ink composition containing an ink coloring material and an organic ink vehicle.

The ink compositions prepared with the compositions of this invention achieve high viscosity levels by merely being stirred into the ink formulation and do not require passage over a three roll mill or use other similar systems to obtain viscosity increases.

The product can be easily dispersed as a rheological additive to provide maximum viscosity build through conventional dispersion means in the absence of three roll milling. The organophilic clays of this invention provide an ink composition which when properly dispersed will have a particle size fine enough that no filtering or milling will be necessary to prepare a usable formulation.

While use of a three roll mill may be used to aid in dispersing the ink coloring pigments or materials so that the ink will print satisfactorily on the printing machine, which procedure is commonly required, such passage is not needed to increase viscosity.

A loose three roll mill pass will be necessary in some instances with ink systems where oxidation takes place so that no entrapped air from the dispersion process will cause the formation of small hardened particles of ink.

The invention may also be carried out by adding the organophilic clay gellant to a previously prepared finished printing ink. These inks may be prepared by any usual method such as with colloid mills, roller mills, ball mills, etc. in which the ink pigment material becomes well dispersed in the organic ink vehicle by the high shear used in processing. This dispersion of pigment in the vehicle constitutes a normal ink and has the conventional tendency to mist.

The organophilic clay gellant is employed in amounts sufficient to obtain the desired viscosity value and tack in the printing ink. If necessary, the viscosity may be further controlled by the addition of a viscosity reducing agent, for example, napthenic oil or solvent. In general, amounts from 0.1% to 10% by weight of the printing ink is sufficient to greatly reduce the misting tendencies of the ink when utilized in high-speed press printing operations with preferred amounts being from 0.5% to 4% and most preferably from 1% to 3% by weight. When the gellant is employed in concentrations less than 0.1% or greater than 10% by weight of the printing ink, the consistency, flow, and other properties affecting the critical characteristic of the ink are seriously impaired, that is, the desired increase in viscosity and tack is not achieved.

The printing inks of the invention may contain conventional ink additives employed in such printing inks.

For example, oil-soluble toners utilized to overcome the brownish tone of mineral oil and carbon black pigment may be employed as well as small amounts of waxes or greases to impart special properties to the printing ink.

The printing inks which may be used with the gellants of the present invention include, but are not limited to, heat set or newsprint ink, water or steam set ink, or lithographic printing ink.

Newsprint inks dry mainly by penetration and absorption, although some heat is utilized to speed drying and prevent smudging. By properly controlling viscosity, tack and yield point with such inks, the organophilic clays of the invention achieve proper penetration in an efficient manner without centrifugal throw off or misting.

When the organophilic clays of the invention are employed with other heat set typographic inks, such as high grade inks for periodicals which contain additives such as binders plus solvents, the inks are extremely flexible, nonsmudging, print well, and set rapidly at high temperatures.

The use of the gellant in steam or water set inks greatly affects viscosity and tack by producing a characteristic shortness in the ink.

In contrast, lithographic printing inks are very similar in composition to typographic inks, except that the body is somewhat greater, and pigment concentration is higher. The benefits of using the organophilic clays given above applies here also.

The following examples are given to illustrate the invention, but are not deemed to be limiting thereof. All percentages given throughout the specification are based upon weight unless otherwise indicated.

In the examples, the following test procedures were employed:

Dispersion

The test ink was drawn down in both channels of a NPIRI G-1 Grindometer and then checked for fineness of grind (small particles) and scratches. The gauge scale reads from "10" to "0". A reading of 10 corresponds to a depth of one mil and a reading of 0 is zero depth. Samples were drawn down so that a minimum of four separate gauge readings were taken and averaged out. Perfect readings for a test sample would be "0" for both fineness of grind and scratches.

Viscosity

Viscosity was measured using a Thwing-Albert falling rod viscometer at a block temperature of 78° F. Air was removed from the ink by simple spatulation and then a rod was completely coated with the ink sample. Three weights were used for obtaining fall time values: 700, 500, 200 grams. These weights were repeated and the data run on a Hewlett-Parkard computer to obtain the predicted Bingham viscosity in poise at 1000 sec.$^{-1}$. The viscosity value chosen for the tables was taken using the data which contained the smallest root mean square deviation from a straight line calculated from the Bingham Equation $$f_B = T - D_B M_B$$

which is the intercept on the shear stress axis when the shear rate is zero.

$f_B$ is the yield value.
T is the shear stress.
$D_B$ is the shear rate.
$M_B$ is the viscosity.

EXAMPLE 1

A web offset, heatset base blue ink formulation was prepared with the ingredients set forth in Table A and passed once over a three roll mill to obtain a fine ink dispersion. The rheological additive was then added slowly to the base ink under the least amount of agitation possible to prevent spill out. Dispersion was than obtained at 3000 rpm on a 0.5 H.P. Premier Dispersator Unit using a Cowles blade. Proper speed was maintained for 15 minutes. Measurements of viscosity were conducted following dispersion, after 24 hours and one week.

Separate ink samples were treated with different organophilic clay derivatives and comparative material at a 2% by weight level.

Comparative Run A did not use a rheological additive whereas Comparative Run B employed fine particle size silica identified commercially as Aerosil R-972 (DeGussa Inc.) Inventive Runs 1 to 3 employed a reaction product of Wyoming bentonite and methyl trihydrogenated tallow ammonium chloride and benzyl trihydrogenated tallow ammonium chloride having the noted milliequivalent ratios.

The results are set forth in Table I. As the results indicate, the comparative rheological additive exhibited a poor fineness of grind and lower gelling efficiency than the inventive formulations.

TABLE A

| WEB OFFSET, HEATSET BASE INK FORMULATION - BLUE | | | |
|---|---|---|---|
| Component | Supplier | Generic Name | % (W/W) |
| Heat Set Varnish 3638 | Superior Varnish and Drier | Phenol resin hydrocarbon formulation | 31.6 |
| Heat Set Microwax Compound C-219 | Dyall* | Microcrystalline wax in heat set vehicle | 2.9 |
| Polyethylene Wax Compound C-169S | Dyall* | Polyethylene wax compound | 8.7 |
| Heat Set Blue Flush D-49-1671 | Sun Chemical | Phthalocyanine blue pigment dispersed in a natural hydrocarbon resin | 46.9 |
| Ionol CP (15% w/w in Magiesol 47) | Shell Chemical | Antioxidant | 0.6 |
| Magiesol 47 | Magie Bros. | High boiling hydrocarbon solvent (median boiling point 470° F.) | 7.3 |
| | | Base Total | 98.0% |
| Rheological Additive | | | 2.0% |

TABLE A-continued

WEB OFFSET, HEATSET BASE INK FORMULATION - BLUE

| Component | Supplier | Generic Name | % (W/W) |
|---|---|---|---|
| | | Final Mix Total | 100% |

*Dyall is a subsidiary of Lauder Chemicals

TABLE I

Comparisons Using Web Offset, Heatset Blue

| Example | Rheo-logical Additive | M.E. | Dispersion | Viscosity poise Initial | 24 hours | 1 week |
|---|---|---|---|---|---|---|
| Comparative A | — | — | 0, 0(0 min) | 56 | 62 | 61 |
| Comparative B | — | — | 10, 0(15 min) | 86 | 88 | 85 |
| Inventive 1 | B3HT | 114.0 | 0, 0(10 min) | 98 | 97 | 94 |
| Inventive 2 | M3HT | 111.0 | 0, 0(10 min) | 99 | 100 | 117 |
| Inventive 3 | M3HT | 116.0 | 0, 0(10 min) | 95 | 92 | 111 |

B3HT is benzyl trihydrogenated tallow ammonium bentonite
M3HT is methyl trihydrogenated tallow ammonium bentonite The quaternary compounds were prepared as in Example 3.

Comparative Run C did not use a rheological additive whereas Comparative Run D employed fine particle silica as in Run B. Comparative Run E employed the rheological additive described in U.S. Pat. 4,193,806, namely a methyl benzyl dihydrogenated tallow ammonium bentonite having a milliequivalent ratio of 112. The data demonstrates that the inventive material prepared from the inventive quaternary compound achieved good dispersion and efficiency under low mixing conditions without any significant increase in viscosity.

TABLE B

WEB OFFSET, HEATSET BASE INK FORMULATION - RED

| Component | Supplier | Generic Name | % of Formulation |
|---|---|---|---|
| Lo-Cal A-7-T | Lauder Chemicals | Heat Set Varnish | 51 |
| Heat Set Microwax Compound C-219 | Dyall* | | 6 |
| Heat Set Fischer-Tropsch Wax C-188 | Dyall* | Heat Set Fischer-Tropsch Wax | 4 |
| Lithol Rubine 66-PP-0229 | BASF-Wyandotte | Heat Set, pre-dispersed red paste | 31% |
| Ionol (15% w/w in Magiesol 47) | Shell Chemical | Antioxidant | 2% |
| Magiesol 47 | Magie Bros. | High boiling hydrocarbon solvent (median boiling point 470° F.) | 9.3 |
| Rheological Additive | | Base Total | 98.0% |
| | | | 2.0% |
| | | Final Mix Total | 100% |

*Dyall is a subsidiary of Lauder Chemicals

TABLE II

| Example | Rheological Additive | Dispersion Fineness of Grind | Scratches | Spatulation result Viscosity at 1000 sec$^{-1}$ (poise) Initial | 24 hours | 1 week |
|---|---|---|---|---|---|---|
| Comparative Run C | None | 0 | 1(4–0), 1(3–0) | 65 | 63 | 66 |
| Comparative Run D | Fumed Silica | 10 | 1(4–0), 1(3–0) | 92 | 89 | 84 |
| Comparative Run E | MB2HT (112ME) | 10 | many (10–0) | 93 | 97 | 89 |
| Inventive Run 4 | B3HT (114ME) | 10 | 1(5–0), 1(4–0), 2(3–0) | 94 | 99 | 95 |
| Inventive Run 5 | M3HT (116ME) | 10 | many (10–0) | 76 | 85 | 88 |

MB2HT is methyl benzyl dihydrogenated tallow bentonite
B3HT is benzyl trihydrogenated tallow bentonite
M3HT is methyl trihydrogenated tallow bentonite

EXAMPLE 2

A web offset heatset base red ink formulation was prepared with the ingredients set forth in Table B and passed over a three roll mill to obtain a fine ink dispersion. The rheological additive was then added at the recited amount and dispersed by simple mixing with a spatula (spatulation) for five minutes. The results are set forth in Table II.

EXAMPLE 3

The procedure of Example 2 was repeated with the same ink base of Table B except that after the rheological additives had been added to the base, dispersion was achieved under dispersion speed conditions of 1000 rpm and 3000 rpm on a 0.5 H.P. Premier Dispersator Unit using a Cowles blade. The results are set forth in Table III (1000 rpm) and Table IV (3000 rpm).

In order to further verify dispersion effects of the rheological additives in the 3000 rpm study, ink samples were passed once over a three roll mill at 500 psig. Viscosity measurements were then taken and repeated after 24 hours. Results are set forth in Table IV.

and scratches. Temperature and dispersion checks were made at each five minute interval. Mixing was typically discontinued when good dispersion was obtained or after 20 minutes maximum mixing time. The blank was mixed for 15 minutes only to give it approximately the same history as the other samples.

The results are set forth in Table V.

The data indicates that the comparative materials maintained a poor fineness of grind, have shown difficulties when dispersed by high speed mixing and have exhibited problems with viscosity stability after aging in the ink. In contrast, the inventive formulations have exhibited good fineness of grind and highly stable viscosities without the need for passage over a three roll mill or similar shearing apparatus.

TABLE III

| Example | Rheological Additive | Mixing Time Min. | Dispersion Fineness of Grind | Scratches | Cowles Results Viscosity at 1000 sec$^{-1}$ (poise) Initial | 24 hours | 1 week |
|---|---|---|---|---|---|---|---|
| Comparative Run F | Blank | 15 | 0 | 0 | 65 | 65 | 66 |
| Comparative Run 6 | Fumed Silica | 15 | 10 | 0 | 78 | 78 | 85 |
| Comparative Run H | MB2HT (111ME) | 15 | 10 | 0 | 93 | 94 | 96 |
| Inventive Run 6 | B3HT (114ME) | 15 | 0 | 0 | 91 | 90 | 92 |
| Inventive Run 7 | M3HT (116ME) | 15 | 0 | 0 | 84 | 82 | 85 |
| Inventive Run 8 | M3HT (121ME) | 15 | 0 | 0 | 77 | 85 | 88 |

MB2HT is methyl benzyl dihydrogenated tallow bentonite
B3HT is benzyl trihydrogenated tallow bentonite
M3HT is methyl trihydrogenated tallow bentonite

TABLE IV

| Example | Rheological Additive | Mixing Time Min. | Dispersion Fineness of Grind | Scratches | Cowles at Viscosity at 1000 sec$^{-1}$ (poise) Initial | 24 hours | 1 week | Three Roll Milling Viscosity at 1000 sec$^{-1}$ (poise) Initial | 24 hours |
|---|---|---|---|---|---|---|---|---|---|
| Comparative Run I | Blank | 10 | 0 | 0 | 64 | 61 | 61 | — | — |
| Comparative Run J | Fumed Silica | 15 | 10 | 0 | 80 | 84 | 82 | 78 | 80 |
| Comparative Run K | MB2HT | 15 | 6 | 0 | 91 | 93 | 91 | 93 | 101 |
| Inventive Run 9 | B3HT | 10 | 0 | 0 | 86 | 88 | 91 | 88 | 92 |
| Inventive Run 10 | M3HT | 10 | 0 | 0 | 83 | 83 | 89 | 81 | 84 |

EXAMPLE 4

The procedure of Example 2 was repeated with the same ink base of Table B. The procedure employed involved taking six grams of additive (2%) which is added to 294 grams of base ink in an open container (pint friction top can) under low shear using a laboratory 0.5 HP Cowles dispersator with the blade just above the bottom of the can. When the additive was completely mixed in, mixing speed was brought to 3000 rpm and the ink was then mixed for five minute intervals and samples taken and tested for fineness of grind

TABLE V

| Examples | Rheological Additive | Dispersion Fineness of Grind | Scratches | Viscosity at 1000 sec.$^{-1}$ (poise) Initial | 24 hours |
|---|---|---|---|---|---|
| Comp. Run L | Blank | 0 | 0 (15 min) | 48 | 51 |
| Comp. Run M | Fumed Silica | 10-0 | 0 (15 min) | 65 | 64 |
| Comp. Run N | B2MHT (102 ME) | 10-0 | 0 (20 min) | 69 | 74 |
| Comp. Run O | MB2HT (111 ME) | 0 | 0 | 58 | |
| Inv. Run 11 | B3HT (114 ME) | 0 | 0 (15 min) | 67 | 67 |
| Inv. Run 12 | M3HT (116 ME) | 0 | 0 (15 min) | 63 | 63 |
| Inv. Run 13 | M Trioleyl (108.6 ME) | 10-0 | Many (5-0) 20 min | 62 | 64 |
| Inv. Run 14 | B Trioleyl (109.6 ME) | 10-0 | 0 (20 min) | 69 | 70 |
| Inv. Run 15 | M Trioctadecyl AB (114 ME) | 10-4 | 0 (20 min) | 67 | 64 |
| Inv. Run 16 | B Trioctadecyl AB (114 ME) | 10-0 | 0 (30 min) | 67 | 67 |

TABLE V-continued

| Examples | Rheological Additive | Dispersion Fineness of Grind | Scratches | Viscosity at 1000 sec.$^{-1}$ (poise) Initial | 24 hours |
|---|---|---|---|---|---|
| Inv. Run 17 | B Trioctadecyl PB (108 ME) | 0 | 0 (20 min) | 58 | 59 |

MB2HT is methyl benzyl dihydrogenated tallow bentonite
B2MHT is benzyl dimethyl hydrogenated tallow hectorite
B3HT is benzyl trihydrogenated tallow bentonite
M3HT is methyl trihydrogenated tallow bentonite
M trioleyl is methyl trioleyl ammonium bentonite
B trioleyl is benzyl trioleyl ammonium bentonite
M trioctadecyl AB is methyl trioctadecyl ammonium bentonite
B trioctadecyl AB is benzyl trioctadecyl ammonium bentonite
B trioctadecyl PB is benzyl trioctadecyl phosphonium bentonite The invention being thus described, it will be obvious that the same may be varied in many ways. Such variations are not to be regarded as a departure from the spirit and scope of the invention and all such modifications are intended to be included within the scope of the following claims.

I claim:

1. A printing ink comprising an organic ink vehicle having dispersed therein an ink coloring material and an organophilic clay gellant comprising the reaction product of a bentonite or hectorite clay having a cation exchange capacity of at least 75 milliequivalents per 100 grams of clay and a material selected from the group consisting of methyl trialkyl quaternary compound and benzyl trialkyl quaternary compound, said quaternary being selected from ammonium and phosphonium and wherein each of the alkyl groups contains 12 to 22 carbon atoms and the amount of said quaternary compound reacted with said clay being from 100 to 130 milliequivalents per 100 grams of clay, 100% active clay basis.

2. The printing ink of claim 1 wherein said clay is sodium bentonite.

3. The printing ink of claim 1 wherein each of said alkyl groups contains 16 or 18 carbon atoms.

4. The printing ink of claim 1 wherein said organophilic clay gellant comprises from 0.1% to 10% by weight of said printing ink.

5. The printing ink of claim 1 wherein said organophilic clay gellant comprises from 1.0% to 3.0% by weight of said printing ink.

6. A printing ink comprising an organic ink vehicle having dispersed therein an ink coloring pigment and an organophilic clay gellant comprising the reaction product of a swellable hectorite or sodium swellable bentonite clay having a cation exchange capacity of at least 75 milliequivalents per 100 grams of clay and a quaternary compound represented by the formula:

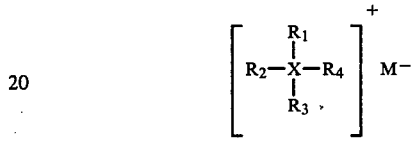

wherein X is nitrogen or phosphorus, wherein $R_1$ is $CH_3$ or $C_6H_5CH_2$; and $R_2$, $R_3$ and $R_4$ is an alkyl group containing 12 to 22 carbon atoms and $M^-$ is selected from the group consisting of chloride, bromide, nitrite, hydroxyl, acetate, methyl sulfate and mixtures thereof; and wherein the amount of quaternary compound reacted with said clay is from 100 to 130 milliequivalents per 100 grams of clay, 100% active clay basis.

7. The printing ink of Claim 6 wherein said organophilic clay comprises the reaction product of a sodium bentonite and methyl trihydrogenated tallow ammonium chloride or benzyl trihydrogenated tallow ammonium chloride.

8. The printing ink composition of Claim 6 wherein said organophilic clay gellant comprises from 0.1% to 10% by weight of said printing ink.

9. A process for preparing a printing ink, which comprises:
   (a) forming a dispersion of an ink coloring material with an organic ink vehicle;
   (b) preparing an organophilic clay gellant comprising the reaction product of a bentonite or hectorite clay having a cation exchange capacity of at least 75 milliequivalents per 100 grams of clay and a material selected from the group consisting of methyl trialkyl quaternary compound and benzyl trialkyl quaternary compound, said quaternary being selected from ammonium or phosphonium, wherein each of the alkyl groups contains 12 to 22 carbon atoms, the amount of said ammonium compound reacted with said clay being from 100 to 130 milliequivalents per 100 grams of clay, 100% active clay basis; and
   (c) dispersing said mixture to prepare a viscous printing ink.

10. The process of claim 9 wherein said clay is sodium bentonite.

11. The process of claim 9 wherein said organophilic clay gellant comprises from 0.1% to 10% by weight of said printing ink.

* * * * *